INTERCHANGEABLE CONTAINER PARTS

Original Filed March 17, 1969 2 Sheets-Sheet 1

INVENTORS.
Lewis S. Mounts
BY Ruben A. Tigner
Benjamin M. Halldorson
ATTORNEY

INTERCHANGEABLE CONTAINER PARTS

Original Filed March 17, 1969 2 Sheets-Sheet 1

INVENTORS
Lewis S. Mounts
BY Ruben A. Tigner
Burke M. Halldorson
ATTORNEY

United States Patent Office

Re. 28,059
Reissued July 2, 1974

28,059

INTERCHANGEABLE CONTAINER PARTS

Lewis S. Mounts, Midland, and Ruben A. Tigner, Bay City, Mich., assignors to The Dow Chemical Company, Midland, Mich.

Original No. 3,595,428, dated July 27, 1971, Ser. No. 807,844, Mar. 17, 1969. Application for reissue July 26, 1973, Ser. No. 382,989

Int. Cl. B65d *41/00, 85/00*

U.S. Cl. 220—42 F 20 Claims

Matter enclosed in heavy brackets [ ] appears in the original patent but forms no part of this reissue specification; matter printed in italics indicates the additions made by reissue.

ABSTRACT OF THE DISCLOSURE

A plurality of container parts including tubs of circular, rectangular, oval, and like various configurations is disclosed. Such tubs are made to fit interchangeably with a single lid design by employing a mating element, as for example, a marginally disposed tongue, of a design and size common to the various tubs so included in such container parts.

DESCRIPTION OF THE INVENTION

This invention concerns packages for luncheon meats and like products, each package including a container comprised of a clear plastic tub in combination with a lid formed of such materials as opaque plastic, plastic foam, metal and the like. Such packages are normally displayed lid side down. Thus, the transparency of the clear tub material permits customers to freely view the products contained within the package.

A packager's distinctive labeling or other advertising material fixed to the clear portion of such tubes restricts viewing, and accordingly, such advertising media is oftentimes not desirable. Nevertheless, it is usually advantageous to provide for distinctive package designs and styling as a means to promote customer package identification and repeat sales. For example, various distinctive tub designs can incorporate rectangular, circular, oval or like configurations. Furthermore, the tub can be quite deep or shallow, and its width and length dimensions can be varied to provide for desired distinctions in such packages.

The capacity of such containers (i.e., 6 ounces, 8 ounces, 10 ounces, etc.) is also relatively wide in range. It has not been uncommon for even a relatively small volume packager to require ten or more different tub and lid combinations to accommodate his particular line of products.

The manufacturer supplying containers to such packagers has thus been faced with a considerable inventory problem. Also frequent changeovers in forming molds to switch production from one lid or tub design to another is usually necessary, particularly if the manufacturer is to supply small volume items. Each such changeover involves downtime and normally a cooling down of the forming apparatus employed. Startup accompanying each such changeover frequently results in an increase of scrap until optimum running conditions are again reached by the forming apparatus.

An associated problem has been that of applying adhesives to the mating regions of such container parts. For example, the lid is frequently provided with a pheripherally continuous groove which fits to a tongue member formed in the tub. Usually the adhesive is preapplied to the lid groove before shipment to the packager. To locate the adhesive in the groove, means are provided which follow the path of the groove while applying or depositing adhesive in the same. Lids having varying groove paths or configurations, i.e., such as circular or rectangular to accommodate corresponding tub configurations, require different groove paths to be followed and thus further complicate the manufacturing process.

Accordingly, it is one of the principal objects of the present invention to provide a line of containers wherein interchangeability is built into such a line to minimize container inventory requirements and manufacturing costs.

Briefly, then, the present invention contemplates a plurality of container parts wherein the parts are interchangeable to minimize the requirements of an inventory. Such containers are of the tub and lid type, and the tubs can be provided in various distinctive designs, configurations and volume capacities, as for example, circular, oval, rectangular or the like. The tubs commonly include a top wall, and a sidewall integral with and extending generally downwardly and outwardly from the top wall. At its lower extent, the sidewall merges with an outwardly extending flange portion which carries a mating means for fitting the tub to the lid member. Regardless of size or shape of the various tubs in such an inventory, the mating means included in the various tub designs is made a constant or nonvariable factor. Accordingly, a single or standard lid can be provided that is interchangeable between the various different tub designs and sizes included in such an inventory.

Other objects and advantages of the present invention and its details of construction will be apparent from a consideration of the following specification and accompanying drawings wherein.

Figure 1:
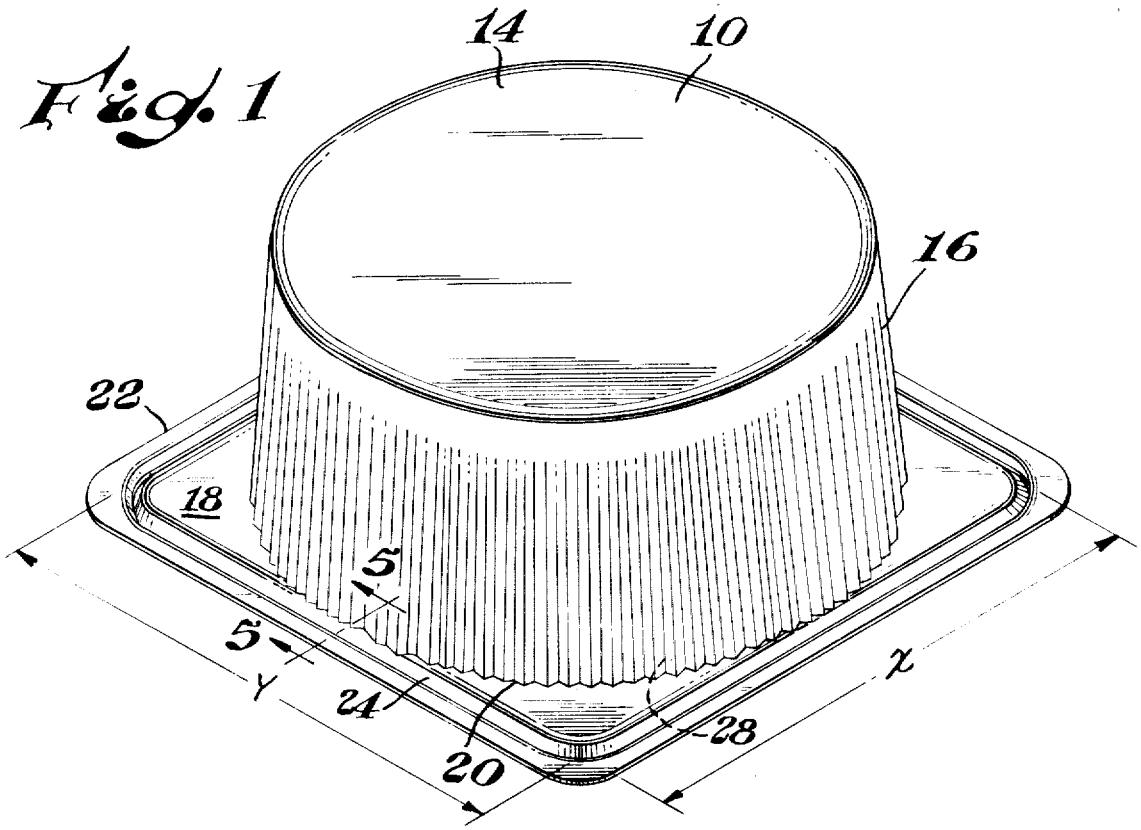
FIG. 1 is an isometric view of a tub constructed according to the principles of the present invention.
Figure 4:
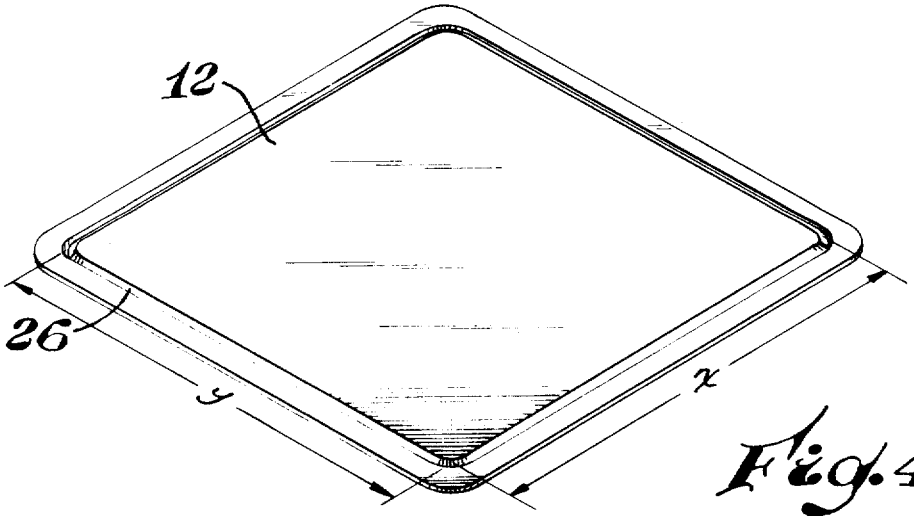
FIG. 4 is an isometric view of a lid adapted to be used interchangeably in combination with the tubs illustrated in FIGS. 1, 2, and 3.

Referring now more particularly to the drawings, there is shown in FIG. 1 a deep generally cylindrically shaped tube 10 adapted for use in combination with a lid 12 of generally flat rectangular shape, as shown separately at FIG. 4.

Figure 5:
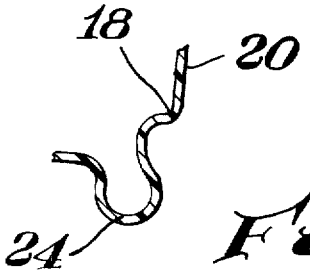
FIG. 5 is an enlarged partial cross-sectional view taken along reference line 5—5 of FIG. 1.

Tub 10 is formed of clear plastic film or sheet material, and includes a top wall 14, and a sidewall 16 peripherally integral with the top wall 14 and extending generally downwardly and outwardly therefrom. A peripherally continuous generally outwardly extending flange portion or member 18 is joined to the lower extent 20 of sidewall 16, as is best shown in FIG. 5. Flange member 18 terminates in a generally rectangularly defined boundary 22 for purposes of accommodating the rectangular shape of lid 12. Carried or defined in flange member 18 is a marginally disposed hollow tongue or mating means 24 which extends rectangularly in a generally consistent or parallel relationship to the rectangular boundary 22 of flange member 18.

Lid 12 shown in FIG. 4 preferably comprises a foam and film laminate as described in some detail in commonly assigned U.S. Pat. application, Ser. No. 639,213 filed May 17, 1967, in the name of Ruben A. Tigner, a coinventor of the present invention, the disclosure of which is hereby incorporated by reference. The lid 12 includes a marginally disposed groove 26 of a peripheral extent coincident with tongue 24 of tub 10. Accordingly, groove 26 is adapted to receive tongue 24 for purposes of fitting the lid 12 over the open end 28 of the tub.

Figure 2:
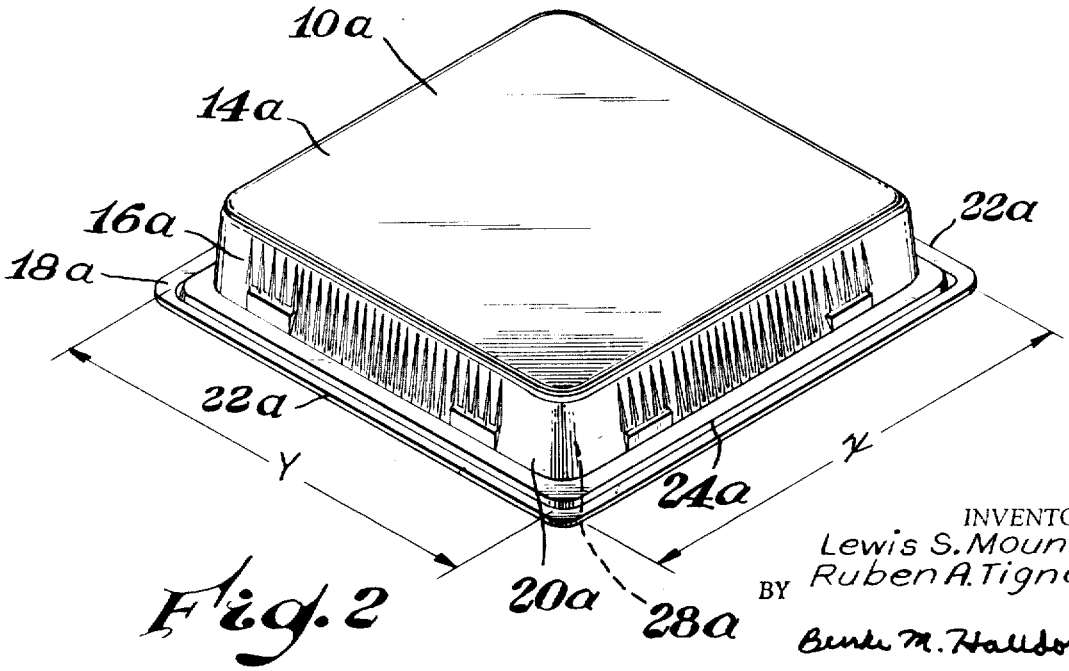
FIG. 2 is a view like FIG. 1 only showing a modified tub construction.
Figure 3:
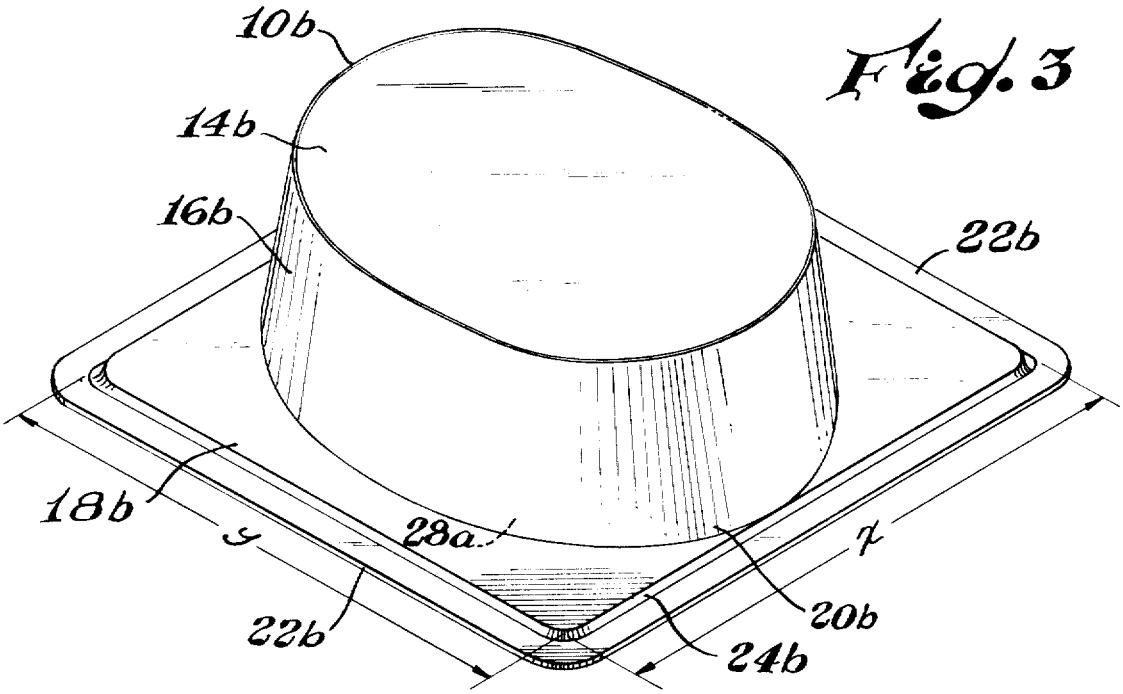
FIG. 3 is a view like FIG. 1 showing yet another modified tub construction.

FIGS. 2 and 3 illustrate significantly different but interchangeable tub configurations and styles for usage in combination with lid 12.

Thus in FIG. 2, there is shown a relatively shallow rectangularly shaped tube 10a including a top wall 14a, and a depending sidewall 16a. Sidewall 16a joins at its lower extent 20a to flange member 18a which terminates in a rectangularly defined boundary 22a. Flange 22a carries a rectangularly extending tongue 24a. Tongue 24a and tongue 24 of tub 10 are peripherally coincident, that is, they are both receivable in groove 26 of lid 12.

Tub 10b of FIG. 3 is of a generally oval configuration and has in common with tubs 10 and 10a, to top wall 14b, a downwardly depending sidewall 16b, and at the lower extent 20b of sidewall 16b, a generally outwardly extending flange member 18b. Flange member 18b terminates in a rectangularly defined boundary 22b, and includes a tongue 24b which extends in parallel fashion inwardly and alongside boundary 22b. Tongue 24b is likewise made coincident in dimension (i.e., of common x and y dimension) to tongues 24 and 24a of tubs 10 and 10a, respectively, whereby lid 12 is adapted to be interchangeable with anyone and all of the tub configurations and designs illustrated herein.

While certain representative embodiments and details have been shown for the purpose of illustrating the invention, it will be apparent to those skilled in the art that various changes and modifications can be made therein without departing from the spirit and scope of the invention.

What we claim is:

1. A container of vacuum packaging components, said components being of preformed generally self-supporting construction and including in cooperative combination: a tub component having a top wall, and a sidewall peripherally integral with said top wall and extending generally downwardly therefrom, said top wall and said sidewall defining a nonrectangular shape, a flange portion extending generally outwardly from said sidewall adjacent the lower extent thereof, said flange portion being peripherally continuous about said sidewall and terminating in a generally rectangularly shaped boundary, a mating means configuration formed in said flange portion, said mating means extending in a closed generally rectangular path located intermediate said rectangularly shaped boundary and said sidewall, a lid having mating means configuration formed therein adapted to fit together with said mating means of said flange, said lid comprising a substantially flat central region immediately surrounded by the lid mating means, whereby interchangeability of said lid between rectangular and nonrectangular tubs is built into said tube and lid combination.

2. The container of claim 1 wherein said sidewall of said tub is generally circular in shape.

3. The container of claim 1 wherein said sidewall of said tub is generally oval in shape.

4. A plurality of [container parts consisting of] preformed vacuum packaging [components] *parts* wherein said parts are interchangeable comprising: a plurality of tubs of transparent plastic provided in at least two basic and different configurations, one of said tub configurations being generally rectangular, another of said tub configurations being nonrectangular in shape, said tubs commonly including a top wall and a sidewall peripherally integral with and extending generally downwardly from said top wall, a flange portion peripherally continuous about and extending generally outwardly from said sidewall, said flange portion including a preformed peripherally continuous mating means, said mating means of said various different tubs being peripherally coincident and each residing in a closed path located intermediate the terminating outer peripheral edge of said flange portion and said sidewall, said parts further comprising a lid having a preformed mating means configuration provided therein and adapted to fit together with said mating means of said tubs, said lid being substantially flat in the area thereof surrounded by the lid mating means whereby said lid is interchangeable with said various tubs regardless of tub volume capacity, configuration, or the like.

5. The plurality of container parts of claim 4 wherein one of said basic tub configurations involves a tub having a sidewall of generally circular shape.

6. The plurality of container parts of claim 4 wherein one of said basic tub configurations involves a tub having a sidewall of generally oval shape.

7. The plurality of container parts of claim 4 wherein said mating means of said lid comprises a groove, and wherein said mating means of said tubs comprise a tongue adapted to fit into said groove.

8. The plurality of container parts of claim 4 wherein said tubs comprise preformed generally self-supporting plastic structure of thickness in a range appropriate for vacuumized luncheon meat packages.

9. The plurality of container parts of claim 4 wherein said lids comprise plastic foam.

10. The plurality of container parts of claim 4 wherein said lid is generally rectangular in shape.

11. The plurality of container parts of claim 10 wherein one of said tubs includes a generally circular sidewall configuration and a flange portion that terminates in a generally rectangularly shaped boundary.

12. The plurality of container parts of claim 11 wherein said tub mating means defines a generally continuous rectangularly shaped path extending parallel along and within said rectangular boundary of said flange.

13. The plurality of container parts of claim 10 wherein one of said tubs includes a generally oval sidewall configuration and a flange portion that terminates in a generally rectangularly shaped boundary.

14. A plurality of container parts wherein said parts are interchangeable comprising: A plurality of tubs each including an open end for filling, said open ends being provided in at least two different sizes [,] *or shapes*, said tubs commonly including a flange portion peripherally continuous about said open ends and extending generally outwardly therefrom, said flange portion including a preformed mating means configuration extending in surrounding relationship about said open ends, said mating means of said tubs being peripherally coincident with each other, said parts further including a standard lid having a preformed mating means configuration integral therewith and adapted to fit together with said mating means of said tubs, the portion of said lid surrounded by the lid mating means being substantially flat, whereby said lid is interchangeable with said tubs regardless of tub shape or the size of the open end thereof.

15. The plurality of container parts of claim 14 wherein said tub comprises preformed generally self-supporting plastic structure.

16. The plurality of container parts of claim 14 wherein the open end of one of said tubs is generally rectangular in shape.

17. The plurality of container parts of claim 14 wherein the open end of one of said tubs is generally circular in shape.

18. The plurality of container parts of claim 14 wherein the open end of one of said tubs is generally oval in shape.

19. The container of claim 2 wherein said lid comprises plastic foam.

20. The plurality of container parts of claim 15 wherein said lid comprises plastic foam.

References Cited

The following references, cited by the Examiner, are of record in the patented file of this patent or the original patent.

UNITED STATES PATENTS

| | | | |
|---|---|---|---|
| 3,454,158 | 7/1969 | Tigner | 206—78 B |
| 3,556,337 | 1/1971 | Harmon | 206—60 R |
| 2,998,158 | 8/1961 | Tupper | 150—.5 X |
| 2,798,631 | 7/1957 | Engel | 220—60 R |
| 2,998,158 | 8/1961 | Tupper | 150—.5 X |
| 3,144,343 | 8/1964 | Fritsche | 150—.5 X |
| 3,342,397 | 9/1967 | Duitsman | 229—2.5 |
| 3,498,018 | 3/1970 | Seiferth et al. | |

WILLIAM T. DIXSON,, Jr., Primary Examiner

A. N. SHOAP, Assistant Examiner

U.S. Cl. X.R.

150—.5; 206—46 F, 78 B; 220—60